US007958396B2

(12) United States Patent
Chitsaz et al.

(10) Patent No.: US 7,958,396 B2
(45) Date of Patent: Jun. 7, 2011

(54) WATCHDOG PROCESSORS IN MULTICORE SYSTEMS

(75) Inventors: Behrooz Chitsaz, Bellevue, WA (US); Darko Kirovski, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 820 days.

(21) Appl. No.: 11/437,341

(22) Filed: May 19, 2006

(65) Prior Publication Data

US 2007/0294601 A1    Dec. 20, 2007

(51) Int. Cl.
G06F 11/00    (2006.01)
G06F 11/30    (2006.01)

(52) U.S. Cl. .................. 714/31; 714/26; 714/39

(58) Field of Classification Search .......... 714/27, 714/31, 32, 55, 57, 39, 26
See application file for complete search history.

(56) References Cited

U.S. PATENT DOCUMENTS

| | | | | |
|---|---|---|---|---|
| 5,428,766 A * | 6/1995 | Seaman | | 709/215 |
| 5,452,443 A * | 9/1995 | Oyamada et al. | | 714/10 |
| 5,560,033 A | 9/1996 | Doherty et al. | | 395/800 |
| 5,708,776 A | 1/1998 | Kikinis | | 395/185.05 |
| 5,978,911 A | 11/1999 | Knox et al. | | 713/1 |
| 6,009,526 A * | 12/1999 | Choi | | 726/1 |
| 6,341,357 B1 | 1/2002 | Ravichandran | | 714/38 |
| 6,505,298 B1 | 1/2003 | Cerbini et al. | | 713/1 |
| 6,536,000 B1 * | 3/2003 | Jackson et al. | | 714/57 |
| 6,550,017 B1 | 4/2003 | Moiin et al. | | 714/4 |
| 6,691,258 B1 * | 2/2004 | Herold et al. | | 714/45 |
| 6,865,157 B1 * | 3/2005 | Scott et al. | | 370/242 |
| 6,918,058 B2 * | 7/2005 | Miura et al. | | 714/30 |
| 6,925,052 B1 | 8/2005 | Reynolds et al. | | 370/217 |
| 7,216,260 B2 * | 5/2007 | Hartmann et al. | | 714/39 |
| 7,237,264 B1 * | 6/2007 | Graham et al. | | 726/23 |
| 7,328,451 B2 * | 2/2008 | Aaron | | 726/13 |
| 7,346,813 B1 * | 3/2008 | Schulz et al. | | 714/48 |
| 7,415,730 B2 * | 8/2008 | Watanabe | | 726/26 |
| 7,451,210 B2 * | 11/2008 | Gupta et al. | | 709/224 |
| 7,472,422 B1 * | 12/2008 | Agbabian | | 726/25 |

(Continued)

FOREIGN PATENT DOCUMENTS

GB    2 379 527 A    12/2003

OTHER PUBLICATIONS

Benso, A., et al., "A watchdog processor to detect data and control flow errors," *Proceedings of the 9th IEEE International On-Line Testing Symposium (IOLTS'03)*, 2003, 5 pages.

(Continued)

*Primary Examiner* — Scott T Baderman
*Assistant Examiner* — Joseph Schell
(74) *Attorney, Agent, or Firm* — Woodcock Washburn LLP

(57) ABSTRACT

Systems and methods are provided for securing a multicore computer chip with a watchdog processor. In a system with a watchdog process and any number of other processors and components, the watchdog processor monitors bus communications between the second processor and at least one third component. The watchdog processor may be further independently coupled to at least one of the other components so that it can monitor internal operations of such component, thereby acquiring detailed information about the specific operations of at least one component in the system. The watchdog processor can enforce an interaction policy on bus communications between components, as well as enforce an independent security policy on the monitored components.

19 Claims, 5 Drawing Sheets

U.S. PATENT DOCUMENTS

| | | | | |
|---|---|---|---|---|
| 7,587,543 | B2* | 9/2009 | Genova et al. | 710/241 |
| 7,631,181 | B2* | 12/2009 | Hirata et al. | 713/151 |
| 2003/0051026 | A1* | 3/2003 | Carter et al. | 709/224 |
| 2003/0126464 | A1* | 7/2003 | McDaniel et al. | 713/201 |
| 2004/0193884 | A1* | 9/2004 | Molaro et al. | 713/175 |
| 2005/0038790 | A1* | 2/2005 | Wolthusen | 707/100 |
| 2005/0188274 | A1 | 8/2005 | Vedam et al. | 714/39 |
| 2005/0223302 | A1 | 10/2005 | Bono | 714/55 |
| 2006/0010344 | A1* | 1/2006 | Zorek et al. | 714/13 |

OTHER PUBLICATIONS

Chen, Y.-Y., et al., "Incorporating signature-monitoring technique in VLIW processors," *Proceedings of the 9th IEEE International On-Line Testing Symposium on Defect & Fault Tolerance in VLSI Systems (DFT'04)*, 2004, 8 pages.

Mahmood, A., et al., "Concurrent error detection using watchdog processors—a survey," *IEEE Transactions on Computers*, 1988, 37(2), 160-174.

* cited by examiner

WATCHDOG PROCESSORS IN MULTICORE SYSTEMS

BACKGROUND

Moore's Law says that the number of transistors we can fit on a silicon wafer doubles every year or so. No exponential lasts forever, but we can reasonably expect that this trend will continue to hold over the next decade. Moore's Law means that future computers will be much more powerful, much less expensive, there will be many more of them and they will be interconnected.

Moore's Law is continuing, as can be appreciated with reference to FIG. 1, which provides trends in transistor counts in processors capable of executing the x86 instruction set. However, another trend is about to end. Many people know only a simplified version of Moore's Law: "Processors get twice as fast (measured in clock rate) every year or two." This simplified version has been true for the last twenty years but it is about to stop. Adding more transistors to a single-threaded processor no longer produces a faster processor. Increasing system performance must now come from multiple processor cores on a single chip. In the past, existing sequential programs ran faster on new computers because the sequential performance scaled, but that will no longer be true.

Future systems will look increasingly unlike current systems. We won't have faster and faster processors in the future, just more and more. This hardware revolution is already starting, with 2-8 core computer chip design appearing commercially. Most embedded processors already use multi-core designs. Desktop and server processors have lagged behind, due in part to the difficulty of general-purpose concurrent programming.

It is likely that in the not too distant future chip manufacturers will ship massively parallel, homogenous, many-core architecture computer chips. These will appear, for example, in traditional PCs and entertainment PCs, and cheap supercomputers. Each processor die may hold up to 32 or more processor cores.

Many-core systems will present a host of security challenges. When programs run concurrently on several processors, opportunities to exploit software and hardware security loopholes proliferate. In order to safeguard users of next-generation electronic devices, increased monitoring capabilities will be necessary.

SUMMARY

In consideration of the above-identified shortcomings of the art, the present invention provides systems and methods for securing a multicore computer chip with a watchdog processor. In a system with two or more processors and any number of other components, a first watch-dog processor can monitor bus communications between other chip components. The watchdog processor can enforce an interaction policy on bus communications between processors and/or other components, as well as enforce an independent security policy on a monitored processor. The watchdog processor may be independently coupled to an internal component of at least one other processor or other chip component, so that the watchdog can monitor internal operations of such component, thereby acquiring detailed information about the component as it interacts in the larger system. Other advantages and features of the invention are described below.

BRIEF DESCRIPTION OF THE DRAWINGS

The systems and methods for watchdog processors in multicore systems in accordance with the present invention are further described with reference to the accompanying drawings in which.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

The concept of a watch-dog processor as a processor that performs a bus monitoring function is generally understood in the art. Watchdog processors have been used to monitor Input/Output (I/O) behavior and generate exceptions upon certain data values on a monitored bus. Watch-dog processors have not however previously been deployed in integrated multicore computer chips or otherwise integrated into multiprocessor processing systems as described herein, nor have watchdog processors been utilized according to the various techniques described herein. As opposed to monitoring a given data bus, in one aspect of the invention a watch-dog processor may be dedicated to a specific processor or group of processors. The watchdog can behave as a parasite that monitors the behavior of its target.

In one embodiment, a watch-dog processor may be used for security and specific performance applications in multicore systems. One objective of such watchdog processors is to observe the behavior of a given application and respond to unexpected behavior or report on certain performance parameters. As the rate of decrease in sizes of semiconductor features moderates in coming years, an increase of on-chip latency in super-linear manner with respect to interconnect length will emerge. As a result, computer chips are increasingly built as a network of relatively small functional units, cores, connected via a networking structure that comprises buses, routers, and relays.

Processes such as firewalls, malware scanners, device drivers, and peer-to-peer networking handlers can be executed on separate processors with dedicated or shared memory and with optimized datapaths. For example, a 100-million transistor processor can pack 3450 i8086 or 18 Pentium P6 processors; obviously a substantial computational power at high frequency clocks that is hard to equal by context switching a large number of processes and/or exploring better instruction level parallelism of individual threads using extreme pipelining or superscalar units but at low frequency clocks.

Figure 1:
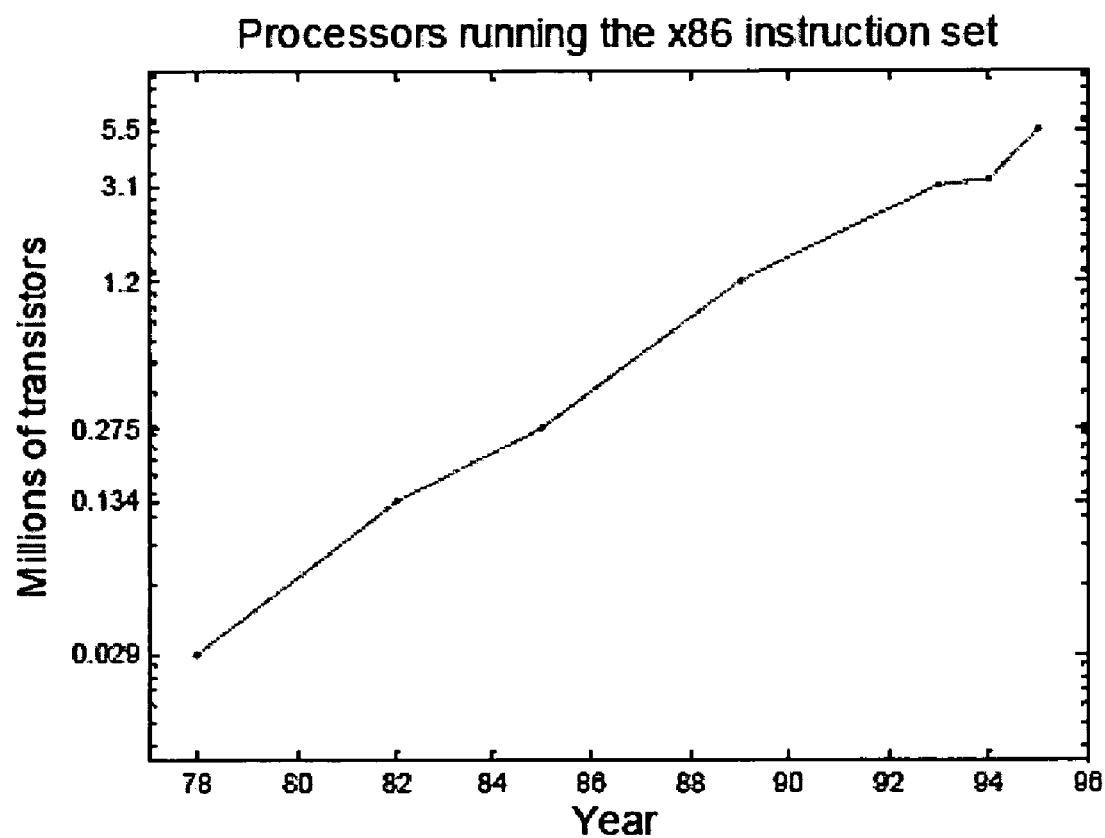
FIG. 1 illustrates trends in transistor counts in processors capable of executing the x86 instruction set.
Figure 2:
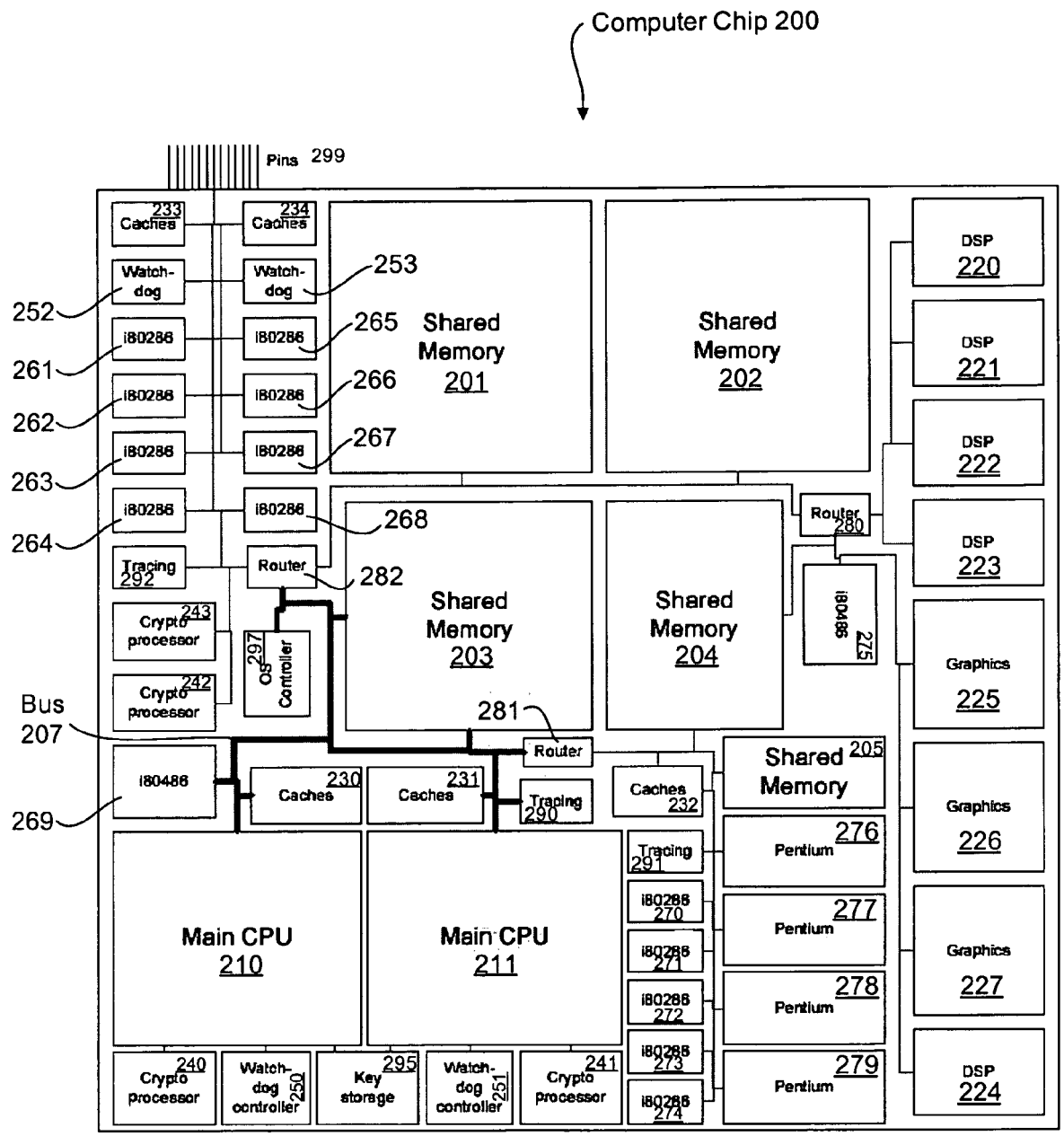
FIG. 2 illustrates a computer chip that comprises several general purpose controller, graphics, and digital signal processing computation powerhouses, as well as watchdog processors to monitor and secure aspects of the chip.

FIG. 2 gives an example of a computer chip that comprises several general purpose controller, graphics, and digital signal processing computation powerhouses. This allows for maximum increase of localized clock frequencies and improved system throughput. As a consequence, system's processes are distributed over the available processors to minimize context switching overhead.

It will be appreciated that a multicore computer chip 200 such as that of FIG. 2 can comprise a plurality of processors, memories, caches, buses, and so forth. For example, chip 200 is illustrated with shared memory 201-205, exemplary bus 207, main CPUs 210-211, a plurality of Digital Signal Processors (DSP) 220-224, Graphics Processing Units (GPU) 225-227, caches 230-234, crypto processors 240-243, watch dog processors 250-253, additional processors 261-279, routers 280-282, tracing processors 290-292, key storage 295, Operating System (OS) controller 297, and pins 299.

Components of chip 200 may be grouped into functional groups. For example, shared memory 203, caches 230, main CPU 210, crypto processor 240, watchdog processor 250, and key storage 295 may be components of a first functional unit. Such grouping is not necessary to practice the invention but will clarify the description by reducing the subset of components that must be discussed to describe operation of an exemplary watchdog processor as contemplated herein. Aspects of an exemplary functional group of a processor are illustrated in FIG. 3.

Figure 3:
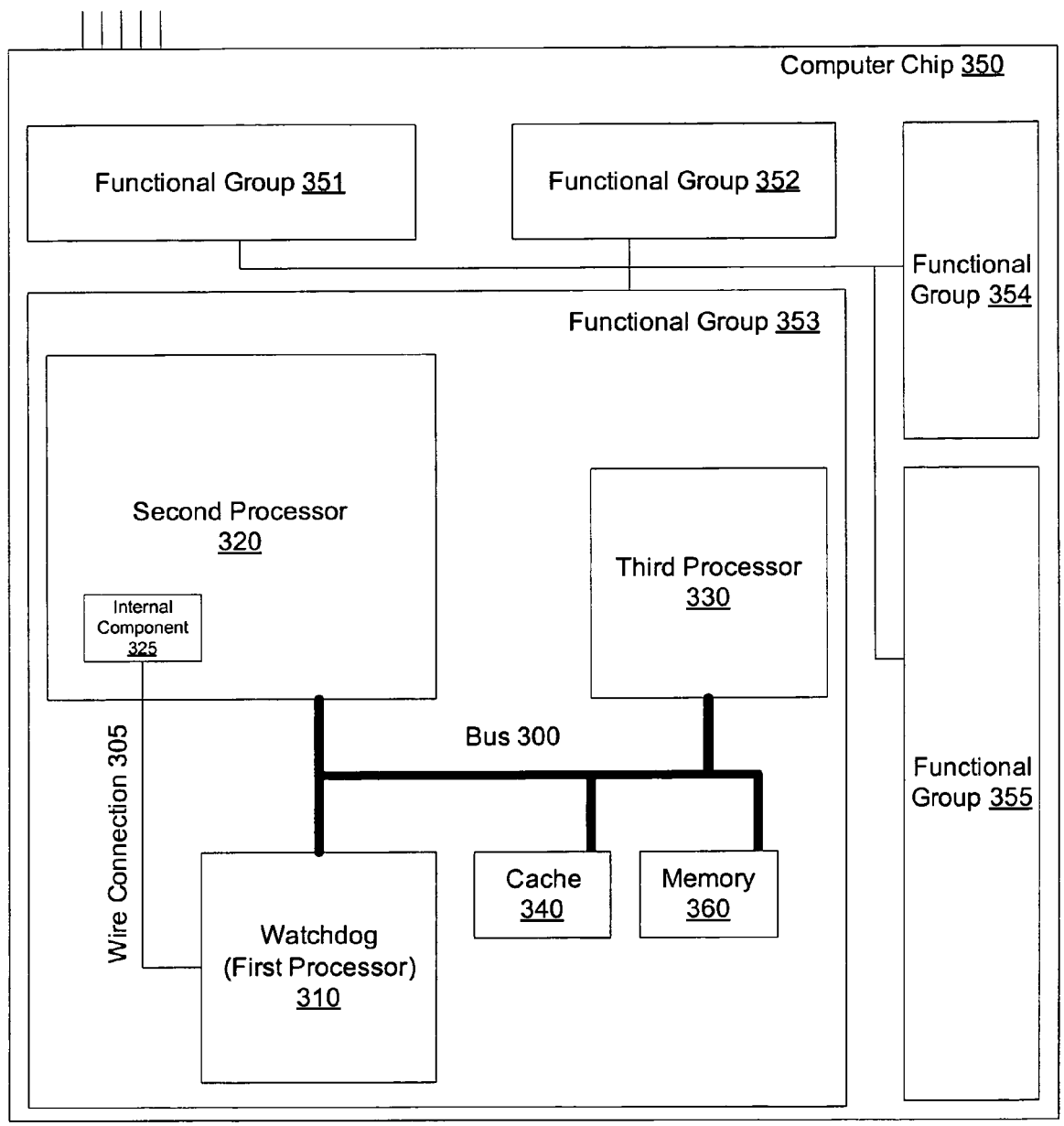
FIG. 3 illustrates a system comprising a computer chip 350 with a plurality of functional groups. An exemplary functional group is expanded to demonstrate and exemplary deployment of a watchdog processor.

FIG. 3 illustrates a system comprising a computer chip 350 with a plurality of functional groups 351-355. An expanded view of functional group 353 is provided to demonstrate one embodiment of the invention. Functional group 353 comprises a first processor 310 (the watchdog), a second processor 320, and at least one third component 330. In this case, at least one third component 330 comprises third processor 330. The processors are coupled to a bus 300, which runs between the second processor 320 and the third processor 330. The watchdog 310 is also coupled to bus 300 so that it can monitor activity on said bus 300. Bus 300 may also be coupled to other aspects of functional group 353 such as cache 340 and memory 360, and may furthermore be coupled to other functional groups 351-355 according to the design specifications of the particular computer chip.

At least one wire connection 305 can run between the watchdog 310 and an internal component 325 of a chip component such as the second processor 320. Additional wire connections may run to further internal components of the second processor 320, and additional wire connections may run to internal components of other chip components such as 330, 351-355, 360, etc. The watchdog 310 can monitor information in an internal component 325 via said wire connection 305.

While FIG. 3 illustrates just three processors for the sake of simplicity, it should be emphasized that watchdog 310 can monitor any number of processors and/or other chip 350 components. Such monitoring may be via a wire connections such as 305, or may be via a bus interactions monitoring approach, or any combination thereof. A chip component is defined herein as any part of the chip that performs some discrete function. In this regard, processors 310, 320, 330 are components, as are functional groups 351-355. Cache 340, memory 360, and bus 300 are also components. Other components which may be monitored by watchdog 310 may be, for example, components supporting video codecs, encryption algorithms, key lengths, authentications mechanisms, and so forth.

Internal component 325 may be one or more of a variety of internal processor components that allow monitoring of behaviors which are generally known and appreciated by those of skill in the art. Candidate values and events to monitor are:

System calls/Child processes. The application or the user can set up policies for the watchdog 310 to obey when detecting suspicious behavior. Upon detection, both the parent and the child process (or system call) can be terminated or paused. For example, the watchdog 310 may detect a system call that launches a command shell; if unexpected, such a call is commonly a sign of system intrusion.

Program counter. For a given program, a specialist and/or a secure automated analysis mechanism may first identify all addresses to which a jump/branch or call/return instruction can go to at compilation time. Thus, any inconsistency with these addresses during program execution can be identified as a bug or intrusion.

Pointer access. The watchdog 310 could verify each pointer access against a heap map. It could build the heap map in parallel while the second processor 320 allocates memory. Each read access to uninitialized memory or deallocation of an uninitialized pointer could be identified by the watchdog 310.

To monitor the various values and events exemplified by those set forth above, watchdog 310 may monitor internal components such as a register, a stack pointer table, and a virtual memory table. Finally, other system parameters such as I/O behavior, detailed page fault statistics, communication to other processes/cores, etc. can be also detected and analyzed by the watch-dog 310. The results can be in this case served as application performance and communication profile to the operating system which could use it for optimized process-to-core assignment and scheduling.

It should be noted that in some configurations, watchdog 310 may be configured to monitor behaviors of functional groups 351-355 as a whole rather than the internal operations of a particular functional group 353. In such embodiments, a wire connection such as 305 may link watchdog 310 to an internal component of one or more of the functional groups 351-355, while a bus akin to 300 connects watchdog 310 to the various functional groups 351-355 instead of or in addition to processors 320 and 330.

FIG. 3 further illustrates an aspect of the invention in which a first processor (watchdog) is electronically coupled to a bus 300, and is configured to monitor the interaction of a second processor 320 and a third processor 330. The second processor 320 is electronically coupled to the third processor 330 via bus 300, and the watchdog can monitor interactions by monitoring certain bus 300 interactions of the processors 320, 330. For example, in a multicore architecture the second processor 320 can be configured to outsource processor work by initiating at least one process on the third processor 330. The watchdog 310 can monitor such activity as well as responses from the third processor 330 back to the second processor 320, and ensure that it represents a legitimate use of the third processor 330 and not an attack or illegitimate use of chip 350 resources.

In this embodiment, it may be useful for watchdog 310 to monitor many of the same behaviors as when watchdog 310 is monitoring internal component 305 of processor 320. For example, system calls/child processes, program counters, and pointer access pertaining to interactions between second processor 320 and third processor 330 are beneficially monitored by watchdog 310 by monitoring bus 300. Embodiments may further beneficially combine monitoring of an internal component 325 with monitoring processor interactions to achieve robust and effective multicore monitoring capabilities.

The watchdog 310 may be configured to enforce an interaction policy against the second processor 320 and/or third processor 330. Such a configuration can be understood with reference to FIG. 4.

Figure 4:
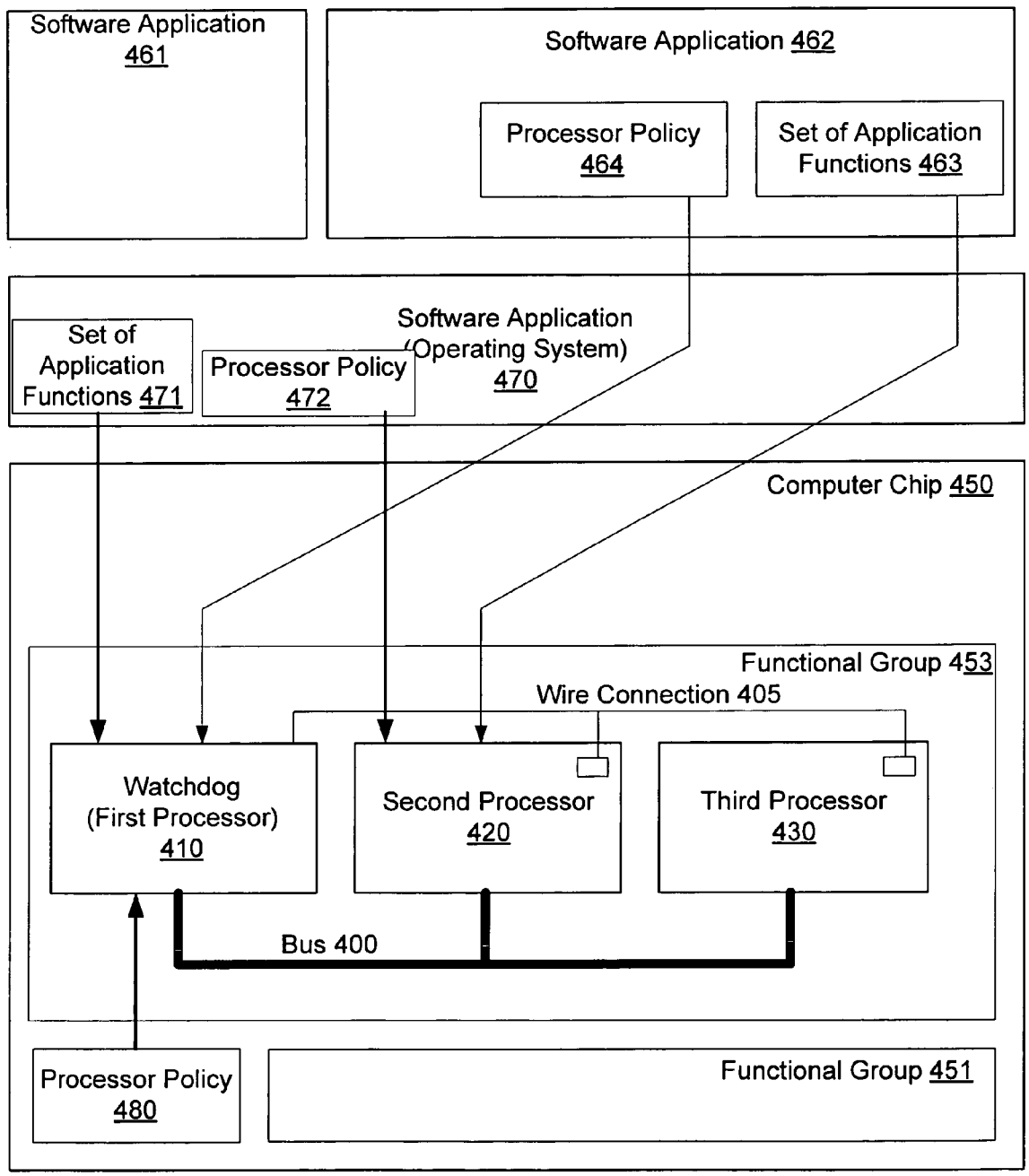
FIG. 4 illustrates an application layer comprising software applications, an operating system layer, and a hardware layer comprising a computer chip. Processor policies may come from a variety of sources, and may be enforced by the watchdog processor against one or more other components in the chip.

FIG. 4 demonstrates an application layer comprising software applications 461 and 462, an operating system layer 470, and a hardware layer comprising computer chip 450. The computer chip 450 comprises a functional group 453 which may comprise various components, such as processors 420 and 430 and watchdog 410 as discussed with reference to FIG. 3. As illustrated in FIG. 4, an interaction policy may come from a variety of sources, such as processor policy 464 from an application 462, processor policy 472 from operating system 470, and processor policy 480 from chip 450.

In one embodiment, an OS 470 may dictate a basic interaction policy 472 to be applied regardless of the process or particular application functions that may be running on second processor 320 or third processor 330. Similarly, a basic policy such as 480 may be universally applied regardless of processes running on second processor 420 or third processor 430. This is not to say that policies 472 and 480 coming from an OS 470 or from hardware 450 may not be conditionally applied. Various useful configurations of the invention may utilize, not utilize, or conditionally utilize hardware and OS processor policies as desired.

Additionally, an application 462 may comprise a processor interaction policy 464 in addition to the application functions 463 supplied with the application 464. Like other processor policies, the application processor policy 464 may provide either independent or supplemental interaction policies to be enforced when the one or more processes associated with the application are executing on a processor 420. For example, some applications may dictate that no system calls may be made and no child processes may be spawned during execution of a particular process. The watchdog 410 may accordingly watch for such a behavior when one of the processors 420 is executing such a process.

An interaction policy may further dictate what action is to be taken by the watchdog 410 when a disapproved behavior occurs. In one embodiment, the watchdog 410 may freeze the processor 420 or 430 that exhibited the disapproved behavior. Other less or more drastic measures are also available depending on a level of security that is desired.

A processor policy may evolve dynamically. Behaviors of a complex multiprocessor system such as chip 450 may be difficult to fully understand, even by experts in the field. In this regard, intelligent logic may be placed in an OS 470 or on chip 450 to learn over time which processor interaction behaviors are considered normal or, conversely, which interaction behaviors are considered abnormal. Policies such as 472 can be updated to reflect advances in knowledge. Another way to dynamically update processor policies 472 may be over a network. For example, as new security loopholes are discovered, a processor policy such as 472 may be updated via a network connection so watchdog 410 can effectively close discovered security loopholes.

FIG. 4 thus illustrates an embodiment of the invention in which a second processor 420 is electrically coupled to a watchdog processor 410 via bus 400, and a software application 462 comprising a set of application functions 463 and a processor policy 464, wherein said set of application functions 463 are executed by the second processor 420, and wherein said processor policy 464 is enforced against said second processor 420 by said first processor 410 (the watchdog processor).

Figure 5:
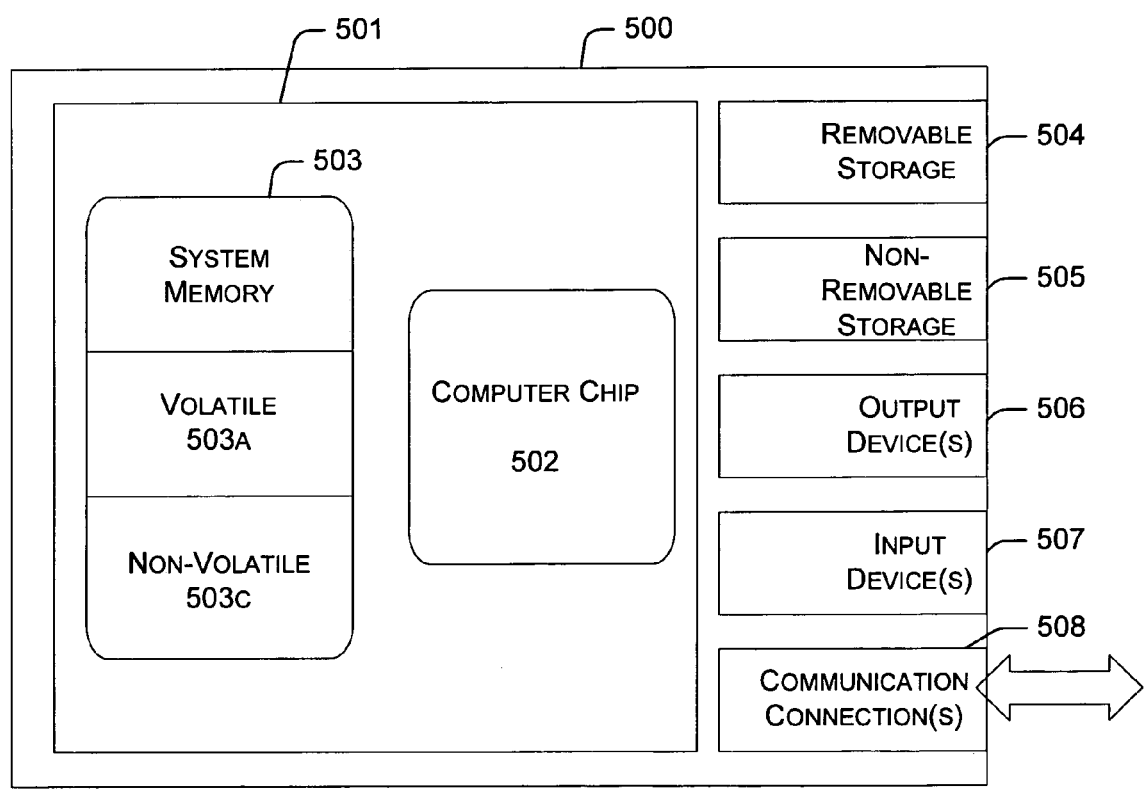
FIG. 5 illustrates an exemplary computing device in which the various systems and methods contemplated herein may be deployed.

FIG. 5 illustrates an exemplary computing device 500 into which the various systems and methods contemplated herein may be deployed. An exemplary computing device 500 suitable for use in connection with the systems and methods of the invention is broadly described. In its most basic configuration, device 500 typically includes a processing unit 502 and memory 503. Depending on the exact configuration and type of computing device, memory 503 may be volatile (such as RAM), non-volatile (such as ROM, flash memory, etc.) or some combination of the two. Additionally, device 500 may also have mass storage (removable 504 and/or non-removable 505) such as magnetic or optical disks or tape. Similarly, device 500 may also have input devices 507 such as a keyboard and mouse, and/or output devices 506 such as a display that presents a GUI as a graphical aid accessing the functions of the computing device 500. Other aspects of device 500 may include communication connections 508 to other devices, computers, networks, servers, etc. using either wired or wireless media. All these devices are well known in the art and need not be discussed at length here.

The invention is operational with numerous general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, cell phones, Personal Digital Assistants (PDA), distributed computing environments that include any of the above systems or devices, and the like.

In light of the diverse computing environments that may be built according to the general frameworks of provided in FIGS. 2-5, the systems and methods provided herein cannot be construed as limited in any way to a particular computing architecture. Instead, the present invention should not be limited to any single embodiment, but rather should be construed in breadth and scope in accordance with the appended claims.

The invention claimed is:

1. A system comprising:
a first processor;
at least one second processor, wherein each second processor comprises a respective internal component, each internal component performing a discrete function;
a third processor; and
a bus coupling said first processor, said at least one second processor, and the third processor, wherein the third processor is configured to monitor at least one interaction between the first processor and the at least one second processor via the bus,
the third processor and each respective internal component of the at least one second processor being in direct connection via one or more wire connections, each of the one or more wire connections being independent of said bus, and said third processor being configured to monitor each internal component of the at least one second processor via a respective wire connection of the one or more wire connections, the third processor monitoring the at least one interaction between the first processor and the at least one second processor and each internal component, the third processor enforcing one of a plurality of selectable interaction policies between the first processor and the at least one second processor, and the enforced one interaction policy of the plurality of selectable interaction policies being selected, based at least in part, on either a particular process or an application running on the at least one second processor.

2. The system of claim 1, wherein said first processor, at least one second processor, and third processor are located on a single computer chip.

3. The system of claim 1, wherein each respective internal component is a register.

4. The system of claim 1, wherein each respective internal component is a stack pointer table.

5. The system of claim 1, wherein the enforced interaction policy dictates an action to be taken by the third processor upon detection of disapproved behavior between the first processor and at least one second processor.

6. The system of claim 1, wherein the enforced interaction policy is applied depending upon at least one process executing on the first processor.

7. The system of claim 1, wherein the third processor monitors at least one of: system calls, child processes, a program counter, or a pointer access.

8. A system comprising:
a first processor;
a functional group coupled to said first processor, wherein the functional group comprises a second processor, and a third processor, the third processor comprising a respective internal component, each internal component performing a discrete function; and
a software application comprising a set of application functions and a plurality of selectable interaction policies, wherein said set of application functions are executed by said functional group, and wherein one interaction policy of the plurality of selectable interaction policies is enforced against said functional group by said first processor, and the enforced one interaction policy detects at least one system call that launches a command shell,
the enforced one interaction policy of the plurality of selectable interaction policies being selected, based at least in part, on either a particular process or an application running on the third processor.

9. The system of claim 8, wherein said first processor is configured such that the first processor can halt a process running on said third processor.

10. The system of claim 8, wherein said second processor, said third processor and said at least one component are located on a single computer chip.

11. The system of claim 8, wherein said enforced one interaction policy detects if a child process is started on said third processor.

12. The system of claim 8, wherein said enforced one interaction policy identifies a plurality of legal jump instructions.

13. The system of claim 8, wherein said enforced one interaction policy identifies a plurality of legal call instructions.

14. The system of claim 8, wherein said enforced one interaction policy identifies a read access to uninitialized memory.

15. The system of claim 8, wherein the at least one component is one of: a shared memory, a cache, a crypto-processor, or a storage unit.

16. The system of claim 8, wherein said enforced one interaction policy is a dynamically evolving processor policy.

17. A system comprising:
a first processor coupled to a bus, and configured to monitor an interaction of a second processor and a third processor, wherein said first processor is configured to enforce one of a plurality of selectable interaction policies against said second processor and third processor;
at least one wire connection for monitoring an internal component of the second processor, wherein the first processor monitors the interaction between the second processor and the third processor and monitors the internal component in order to enforce the one interaction policy of the plurality of selectable interaction polices, wherein said second processor is coupled to said third processor via said bus and wherein said second processor is configured to initiate at least one process on said third processor,
the enforced one interaction policy of the plurality of selectable interaction policies being selected, based at least in part, on either a particular process or an application running on the second processor.

18. The system of claim 17, wherein said enforced one interaction policy is a dynamically evolving processor policy.

19. The system of claim 18, wherein said dynamically evolving interaction policy identifies one of: normal behavior or abnormal behavior of one or more of said second and said third processor.

* * * * *